Oct. 25, 1932.  E. E. LOOTENS  1,884,010
DIRECTION INDICATOR FOR VEHICLES
Filed June 24, 1930   2 Sheets-Sheet 1
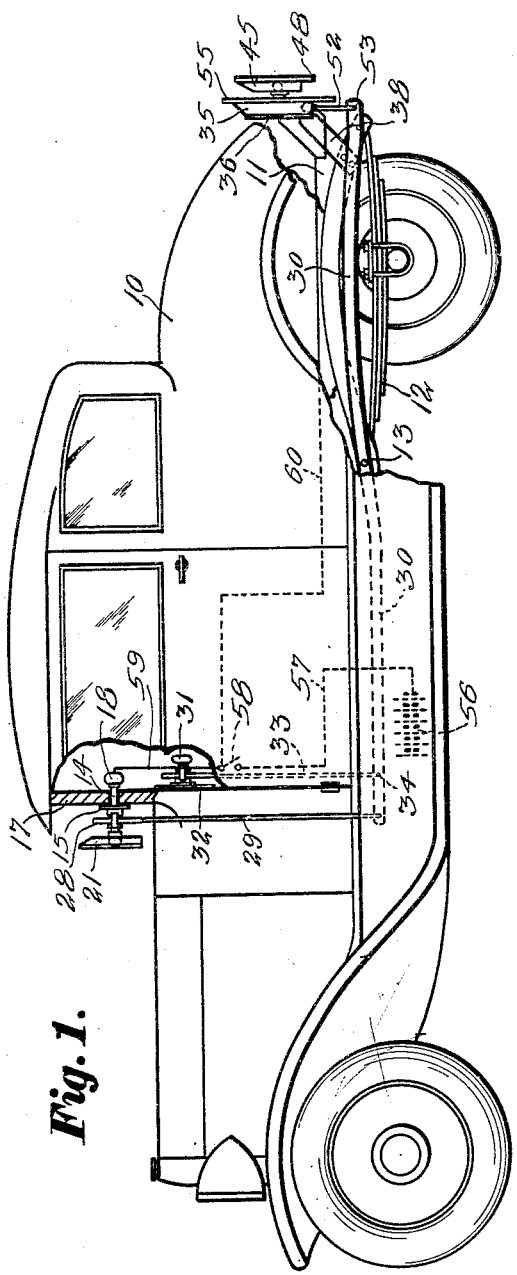
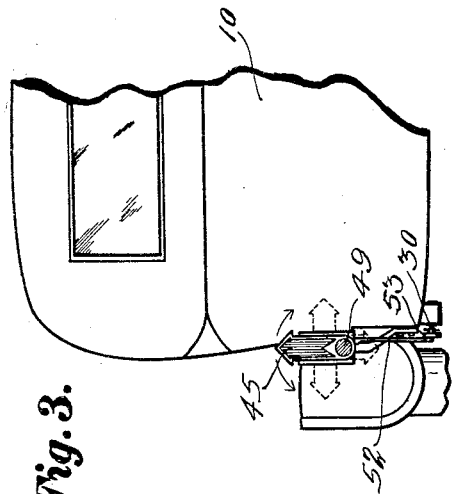
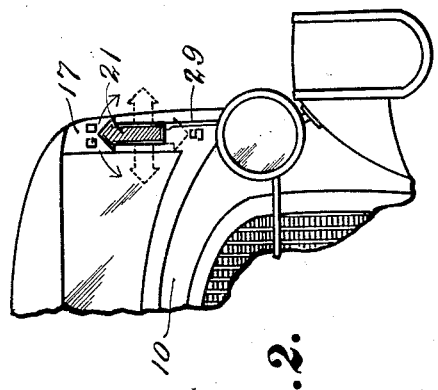
Inventor
E. E. Lootens
By *Arthur H. Sturges*
Attorney Oct. 25, 1932. E. E. LOOTENS 1,884,010
DIRECTION INDICATOR FOR VEHICLES
Filed June 24, 1930 2 Sheets-Sheet 2
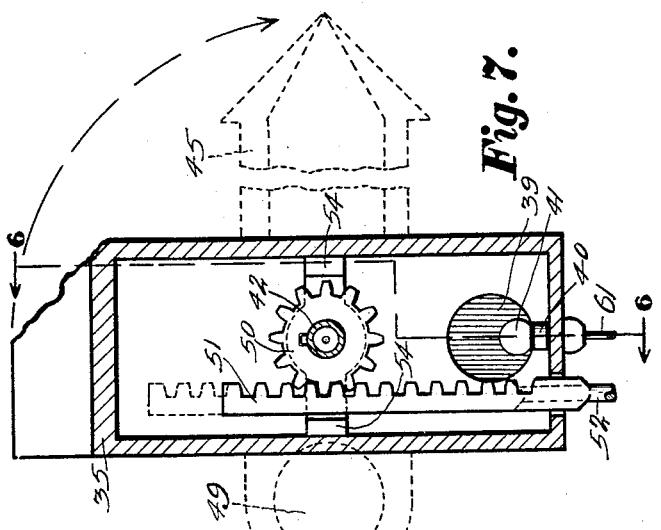
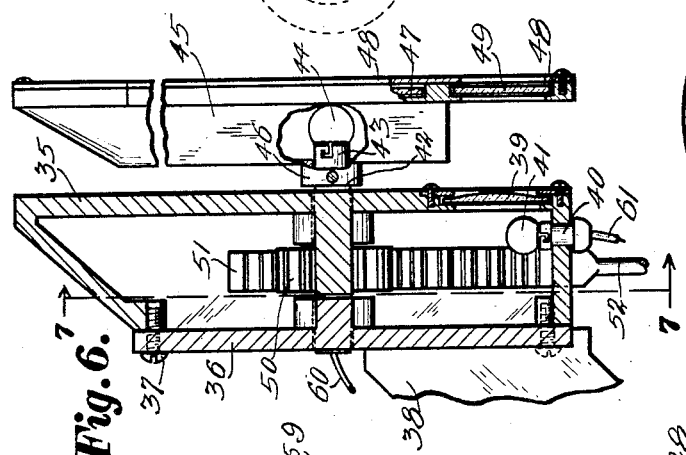
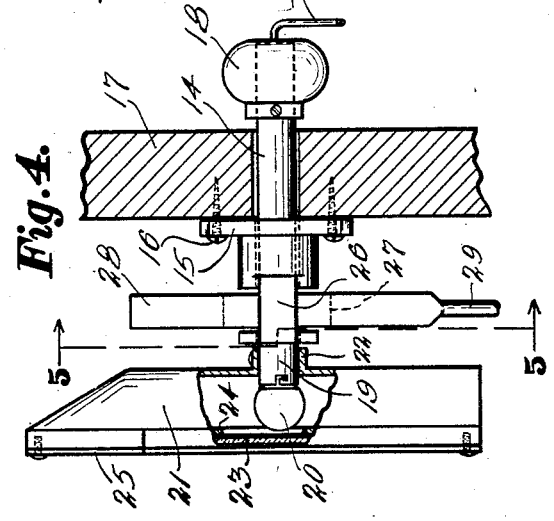
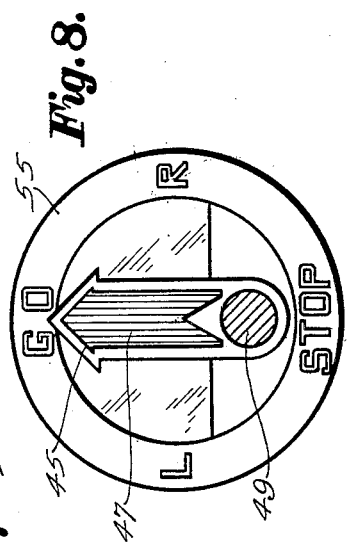
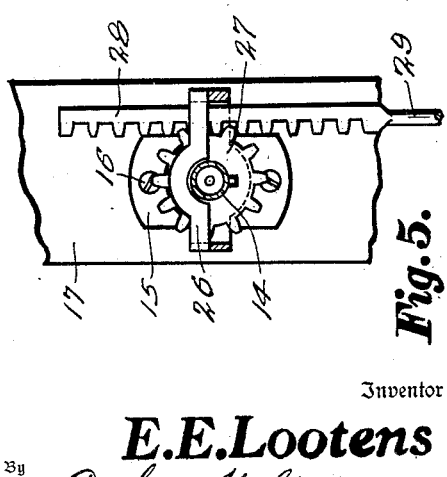
Inventor
E.E.Lootens
Arthur H. Sturges
Attorney Patented Oct. 25, 1932

1,884,010

UNITED STATES PATENT OFFICE

EVERETT E. LOOTENS, OF COUNCIL BLUFFS, IOWA

DIRECTION INDICATOR FOR VEHICLES

Application filed June 24, 1930. Serial No. 463,524.

The present invention relates to indicators for vehicles, and more particularly to an improved device for application to motor vehicles for showing to pedestrians and other vehicles the proposed changes in direction or the starting and stopping of the vehicle.

An object of the present invention is to provide a simple and practical device which may be easily constructed and mounted upon motor vehicles of conventional form and which will require no changes in the shape or construction of the same and which will not interfere with the usual operation or control of the vehicle.

Another object of the present invention is to provide a signal or indicator of this character which will designate the proposed operation of the vehicle not only by means of light, for use particularly at night, but also by means of a dial and indicator which is incorporated in the structure so as to be operated thereby when making the adjustment of the indicator for showing by means of light the proposed change.

The invention also aims at the provision of an improved construction of indicator embodying front and rear elements for simultaneous operation to show at the front and at the rear of the vehicle the desired change in operation to be effected and which are so connected as to be operable from one point disposed in the operator's compartment and within easy reach, and wherein the lights employed are arranged in circuit so that they may be cut off in the daytime when desired.

A still further object of the invention is to provide an operating means for the indicator which may be directly connected to the front indicator or which may be arranged in spaced relation thereto for controlling the same, the operating means being thus connected between the front and rear elements of the signal or in direct connection with the front element.

With the foregoing and other objects in view, the invention will be more fully described hereinafter, and will be more particularly pointed out in the claim appended hereto.

In the drawings, wherein like symbols refer to like or corresponding parts throughout the several views.

Figure 1 is a side elevation, partly in section, of a motor vehicle equipped with the direction indicator of this invention.

Figure 2 is a fragmentary front elevation of the vehicle showing the indicator applied thereto and in normal position of movement of the vehicle, the dotted lines showing the adjustments of the indicator to show right and left turns thereof.

Figure 3 is a fragmentary rear elevation of the vehicle showing the rear element of the indicator in its several positions corresponding to the showing in Figure 2.

Figure 4 is a fragmentary enlarged sectional view through the front element of the indicator showing the manual means thereon and the connection leading to the rear element of the indicator.

Figure 5 is a transverse section taken through the same substantially on the line 5—5 of Figure 4.

Figure 6 is a fragmentary enlarged vertical section taken substantially on the line 6—6 of Figure 7 of the rear element of the indicator.

Figure 7 is a transverse section taken through the same substantially on the line 7—7 of Figure 6, and Figure 8 is a detail enlarged rear elevation of the rear element showing the dial and the indicator arm.

Referring to the drawings, 10 designates the body of a motor vehicle of any conventional type and which is mounted upon a frame 11 to the rear portion of which is secured the usual spring 12, the latter being pivoted to the frame by a pivot pin 13 at the forward end of the spring.

The indicator or signal comprises two elements, a front element and a rear element. The front element, as best shown in Figures 4 and 5, comprises a shaft 14 journalled through a bracket 15 adapted to be secured by screws 16 or the like to one of the front posts 17 of the vehicle body 10 at preferably the left side thereof, the posts 17 having an opening formed therethrough for the reception of the shaft 14. A knob 18 is detachably mounted on the shaft 14, at the inner end of the latter and is adapted to be disposed at the inner side of the post 17 in position for easy access of the operator so that the knob 18 and the shaft 14 may be turned in the desired direction and to the desired extent.

The shaft 14 projects forwardly from the bracket 15 and carries a lamp socket 19 on its outer end in which is detachably mounted a lamp bulb 20 of the usual form. The outer end of the shaft 14 also carries about the bulb 20 a pointer casing 21 which is shaped to the general configuration of an arrow and which intermediate its ends is provided in its back wall with a sleeve or bushing 22 adapted to be secured adjustably to the shaft 14 by a set screw or the like. The outer side of the pointer casing 21 is closed by a transparent pane 23 which is green and which may comprise a plate of green glass co-extensive with the front of the casing 21 and seated upon a shoulder or rabbet 24 and held thereto by a frame or rim 25.

As shown in Figure 2 the front post 17 may be provided at a point adapted to register with the head of the arrow or pointer casing 21, with a suitable designation, such as the word "GO" for indicating that the vehicle is to be started or is in motion and is to be continued in motion. In like manner, as shown in dotted lines in Figure 2, the front post 17 is also provided below the front element and adapted to align with the head of the pointer casing 21 with a suitable designation such as "S" meaning stop or that the vehicle is not to be operated.

As may be best seen from Figures 4 and 5, the bracket 15 is provided with a frame 26 which is of the open type and which lies between the bracket 15 and the pointer casing 21. The shaft 14 is provided, within this frame 26, with a pinion 27 which meshes with a rack bar 28 held against the pinion by one side of the frame 26 and which at its lower end is connected to a connecting rod 29 which, as shown in Figure 1, extends downwardly through the lower part of the frame body 10 and is pivotally connected to the forward end of a connecting lever 30. The lever 30 extends lengthwise beneath one side of the body 10 and is pivotally connected intermediate its ends upon the spring pin 13, the lever 30 extending rearwardly therefrom to the rear end of the vehicle body. It is apparent that when the shaft 14 is turned the rod 29 will be raised or lowered, depending upon the location of rotation of the shaft 14 so that the lever 30 will be rocked.

Another means of operating the shaft 14 comprises a second knob 31 with its shaft mounted on a bracket 32 secured to the instrument board of the vehicle, or in other suitable position of easy access, and which is provided with the rack and pinion structure of Figure 5 for operating a connecting rod 33 which extends downwardly through the bottom of the body 10 and is connected at 34 to the lever 30 at a point in rear of the rod 29. By turning the rod 29 the lever 30 is rocked and the front element of the signal is correspondingly adjusted.

The rear element of the signal is shown in detail in Figures 6, 7 and 8. A casing 35 is provided with a rear cover plate 36 detachably secured thereto by screws 37 or the like and which is carried upon the rear end of a bracket 38 secured to the rear end of the vehicle body 10. The outer wall of the casing 35 has near its lower end and intermediate its lateral portions a red glass or lens 39 which is preferably round and of relatively small diameter, and the casing 35 carries behind the lens 39 a lamp socket 40 in which is seated an electric bulb 41.

The casing 35 carries a shaft 42 which extends from front to rear through the casing and on its rear end, and outside of the casing 35 carries a lamp socket 43 in which is mounted a bulb 44. The bulb 44 is enclosed within a pointer casing 45 having a rearwardly projecting sleeve 46 for adjustable mounting upon the rear end of the shaft 42. The outer side or front of the casing 45 is open and provided with a marginal shoulder 46 upon which is seated a red pane of glass 47 held against the shoulder 46 by a rim 48 or the like. The front portion of the casing 45 is extended beyond the inner end of the casing to support a green glass pane 49 which is held in place by the extension of the rim 38, the green glass 49 adapted to register with the red lens 39 for intercepting the rays therefrom when the pointer casing 45 is in upright vertical position. This extension of the pointer casing 45 comprises a tail piece adapted to be swung around into and out of line with the lens 39 when the shaft 42 is turned.

The shaft 42 is provided, within the casing 35, with a pinion 50 which meshes with a rack bar 51 carried at its lower end upon a connecting rod 52 which extends downwardly and is pivotally connected at 53 to the rear end of the lever 30. The casing 35 is provided therein with a frame 54, one side of which is arranged opposite the rack bar 51 for holding the latter in intermeshing engagement with the pinion 50.

If desired, the casing 35 may be provided upon its outer side with a dial 55 which faces rearwardly from the vehicle and which is arranged concentric to the shaft 42 so that the pointer casing 45 may traverse the dial 55 and thus indicate by means of suitable indicia on the dial the indication desired.

In Figure 8 it will be noted that the dial 55 is provided with indicia which indicate, at the top of the dial "GO", at the bottom of the dial "STOP", and which also indicate right and left turns by "L" and "R".

As shown in Figure 3, the dial 55 may be omitted if desired and the mere positioning of the indicator casing 45 will be sufficient for designating the proposed change in the control of the vehicle.

As shown in Figure 1, there is disclosed diagonally the vehicle battery 56 which is grounded in the usual manner and from which a wire 57 extends which leads to a switch 58 arranged upon the vehicle in a position of easy access to the operator. From the switch 58 a branch wire 59 is connected to the front element of the indicator and may extend through the knob 18 and shaft 14 to the lamp socket 19 for illuminating the bulb 20 and thus lighting the front pointer casing 21. The rear pointer casing 45 is lighted by the branch wire 60 which leads from the switch 58 to the rear of the vehicle body 10 and may be connected centrally through the shaft 42 to the socket 43 of the rear bulb 44. The bulb 41, which takes the place of the usual tail light, is supplied with current through a wire 61 which leads to the usual lighting system of the vehicle.

In operation, when it is desired to start the vehicle the operator may grasp either the knob 18 or the knob 31, which ever knob is within easy reach. It is of course understood that the knob 18 may be omitted, and that the shaft 14 may terminate in the bracket 15 instead of drilling a hole through the front post 17 of the car body. When the knob 31 is turned it operates the connecting rod 33 with the result that the forward end of the lever 30 is moved in a direction to operate the front connecting rod 29 and turn the shaft 14 into position to swing the pointer casing 21 vertically upward so as to designate from the front of the vehicle 10 that the operator is to go. At the same time, the rear end of the lever 30 is swung in a reverse direction so as to operate the connecting rod 52 and turn the shaft 42 in such direction as to swing the rear pointer casing 45 vertically upward to indicate at the rear of the vehicle 10 that the operator is going to go.

Of course the arrangement of the rack bars 28 and 51 is such with respect to their pinions 27 and 50 as to effect the desired turning of the pointer casings 21 and 45 for simultaneously indicating the same proposed movement of the vehicle at both the front and rear thereof.

In like manner, when the vehicle is moving and it is desired to change the direction to either the right or to the left, or to bring the vehicle to a stop, the operator first operates the knob within easy reach and turns the same so as to swing the lever 30 in the desired direction and to the desired extent for swinging the pointer casings 21 and 45 downwardly to the proper angle or position to indicate at the front and rear of the vehicle 10 the proposed change in the control of the vehicle.

As the pointer casings 21 and 45 are of arrow shape they will naturally indicate by their change of position the proposed change in the direction or control of the vehicle.

At night, the operator closes the switch 58 which illuminates the bulbs 20 and 44 to light up the pointer casings 21 and 45 and to show the panels thereof in the color green, and the panels, as shown in Figures 2, 3 and 8, are of arrow shape so that at night the outline of the arrow will be clearly visible.

Where the bulb 41 is employed in the bottom of the casing 35 as an ordinary tail light, it will show the usual red when the vehicle is changing directions and when it is brought to a stop, and the colored glass 49 in the tail piece will only intercept the light rays from the red lens 39 when the arrow is uppermost and may change the depth of color of the red light. Thus when the red light is uncovered by the glass 49 its increased brilliance will be immediately observed by those following the vehicle 10 and thus a visual indication will be given as to the operation of the signal.

It is obvious that various changes and modifications may be made in the details of construction and design of the above specifically described embodiment of this invention without departing from the spirit thereof, such changes and modifications being restricted only by the scope of the following claim:

What is claimed is:

An indicator for vehicles comprising a front signal element, a rear signal element, a lever adapted for pivotal mounting upon the vehicle between the elements, a connection between the opposite ends of said lever and the respective front and rear elements, and manual means connected to the lever for operating the lever and simultaneously adjusting the front and rear elements.

In testimony whereof, I have affixed my signature.

EVERETT E. LOOTENS.